US009513763B1

(12) United States Patent
Adams

(10) Patent No.: US 9,513,763 B1
(45) Date of Patent: Dec. 6, 2016

(54) ADAPTIVE USER INTERFACES

(71) Applicant: Amazon Technologies, Inc., Reno, NV (US)

(72) Inventor: James Peter Adams, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 98 days.

(21) Appl. No.: 14/220,188

(22) Filed: Mar. 20, 2014

(51) Int. Cl.
*G06F 3/048* (2013.01)
*G06F 3/0481* (2013.01)

(52) U.S. Cl.
CPC .................... *G06F 3/0481* (2013.01)

(58) Field of Classification Search
CPC ........................................ G06F 3/048
See application file for complete search history.

(56) References Cited

U.S. PATENT DOCUMENTS

| | | | | |
|---|---|---|---|---|
| 6,023,714 A | * | 2/2000 | Hill | G06F 17/211 715/235 |
| 2015/0072663 A1 | * | 3/2015 | Chande | G06Q 10/10 455/414.1 |

* cited by examiner

*Primary Examiner* — Thanh Vu
(74) *Attorney, Agent, or Firm* — Athorus, PLLC

(57) ABSTRACT

User interfaces associated with software applications or computer devices may be automatically laid out or configured based on attributes of a user, or operational characteristics or environmental conditions of the software applications or the computer devices. Where information or data regarding a user, a software application or a computer device is determined from any source (e.g., a sensor), such information or data may be compared to information or data associated with other users, software applications or computer devices, and a user interface may be presented on a computer display in a layout or configuration preferred by the other users. The layout or configuration may be identified by determining any number of covariances or correlations between such information and data and any layouts or configurations, or actions taken to establish such layouts or configurations by the other users.

21 Claims, 12 Drawing Sheets

ADAPTIVE USER INTERFACES

BACKGROUND

Many computer software applications or computer operating systems provide a number of interactive features for performing one or more specific functions that are provided on a user interface. For example, a graphical design application may commonly permit a user to save a graphic image file by clicking on an interactive button displayed on a user interface, or by selecting an option from a drop-down menu (e.g., "File," and "Save as . . . ") rendered on the user interface. Additionally, the locations or arrangements of interactive features within a user interface may typically be customized at a user's discretion. For example, a user may elect to display a tool such as a pallet having a set of interactive features in a substantially horizontal orientation on a user interface or in a substantially vertical orientation, and in a fixed position with regard to a grid on the user interface, or in a floating, adjustable position on the user interface.

Moreover, many software applications that provide a number of adjustable features or options on a user interface are pre-loaded or pre-configured to present such features or options in a predefined, default manner. For example, a web browser usually provides an address bar and action buttons along a top border of a user interface, and a slider bar along a right side of the user interface. A word processing application is typically configured to open word processing documents in a particular size (e.g., corresponding to "letter," or 8½"×11" sheets) or orientation (e.g., substantially vertical, or portrait), or to display characters in a particular font (e.g., Arial). Such sizes, orientations or fonts are typically selected to appeal to the average user. Similarly, a spreadsheet application may be commonly configured to open spreadsheet documents with cells arranged in columns and rows of conventional sizes by default. Likewise, an operating system for a smartphone may arrange icons or buttons on a display in a general manner that is assumed to correspond with the desires of a typical user.

Occasionally, however, different users of a software application or computer device may have different preferences for the functional layout or characteristics of a user interface by such an application on such a device. The preferences of such users may vary on any basis, such as the users' respective levels of experience with software applications of the same or similar types, the roles or functions which each user may play within a business or other organization, as well as any relevant operational characteristics of the software application or the computer device, or any relevant environmental conditions in a vicinity of the computer device. Although the layouts or configurations of features or options that are rendered within user interfaces provided by software applications and presented on computer displays may be modified from their default conditions at a later time, the capacity to modify such layouts or configurations, or the process steps required in order to do so, are frequently not readily apparent to a user. Presently, the only known means for presenting features or options in a user interface in a manner that may be preferred by a user is to establish a default layout or configuration of such features or options that is believed to be safe and unobjectionable, as there is no way to accurately predict a preferred layout or configuration for each individual user.

DETAILED DESCRIPTION

As is set forth in greater detail below, the present disclosure is directed to systems and methods for providing adaptive user interfaces. Specifically, according to some embodiments of the present disclosure, the layout or configuration of one or more aspects of a user interface associated with a computer software application or a computer hardware component may be customized in advance for one or more particular users, or altered after the fact, as necessary, for such users, based on any relevant information or data that may be identified or obtained regarding a user, a software application or a computer device.

For example, the information or data may suggest one or more similarities or relationships between the user and other users, and a rules set for determining a preferred layout or configuration of a user interface may be identified for the user, or for other users, based on such similarities or relationships. The information or data may further represent one or more operational characteristics of a software application or computer device, and a rules set for determining a preferred layout or configuration of a user interface may be derived for the user, or for other users, based on such operational characteristics. Alternatively, the information or data may also represent one or more environmental conditions associated with the software application or the computer device, and a rules set for determining a preferred layout or configuration of a user interface may be derived for the user, or for other users, based on such operational characteristics.

In accordance with the present disclosure, once a preferred layout or configuration of a user interface is identified for a user, or for other users, according to a rules set, the preferred layout or configuration may be instituted in real time or in near-real time, or according to any schedule and on any basis. For example, the layout or configuration of the user interface may be pushed (e.g., automatically implemented) to a computer device operated by a user, or by other similarly situated users, on an automatic basis in real time or in near-real time by one or more local or remote computer modules. Alternatively, the layout or configuration of the user interface may be implemented at a later time, such as with the rollout of a new service pack or other form of software update or upgrade. Moreover, once a layout or configuration has been identified for a user interface of a software application on a computer device having certain operational characteristics or operating under specific environmental conditions, the layout or configuration may applied to user interfaces of other software applications on other computer devices, where such applications or devices share the same operational characteristics, or are operating under the same or similar environmental conditions.

Figure 1:
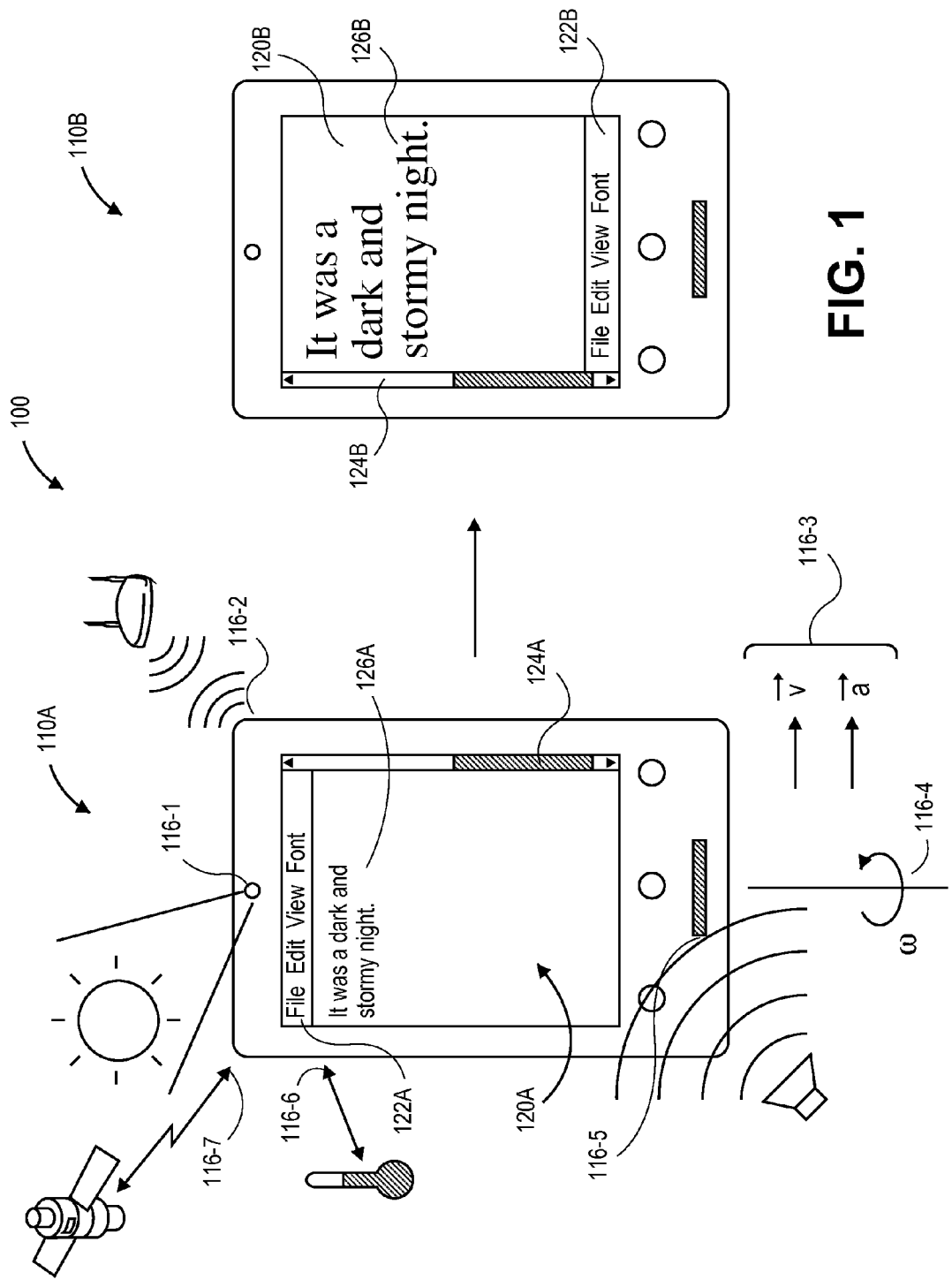
FIG. 1 is a block diagram of an illustrative system providing adaptive user interfaces in accordance with embodiments of the present disclosure.

Referring to FIG. 1, a system 100 for providing adapted user interfaces on a smartphone 110 is shown. The smartphone 110 includes a plurality of sensors 116-1 through 116-7 and is shown as displaying user interfaces 120A, 120B associated with a word processing application thereon.

As is shown in FIG. 1, the sensors 116-1 through 116-7 are configured to determine one or more operational characteristics or environmental conditions of the smartphone 110. The sensor 116-1 is an optical sensor (e.g., a camera) configured to capture information or data regarding light conditions in a vicinity of the smartphone 110. The sensor 116-2 is a wireless transceiver configured to provide connectivity between the smartphone 110 and one or more external sources (e.g., a router). The sensor 116-3 is an accelerometer configured to determine information regarding accelerations or velocities of the smartphone 110. The sensor 116-4 is a gyroscope configured to determine angular orientations or velocities of the smartphone 110. The sensor 116-5 is a microphone configured to capture sounds and other acoustic information in a vicinity of the smartphone 110. The sensor 116-6 is a thermometer configured to provide information regarding temperatures in a vicinity of the smartphone 110. The sensor 116-7 is a Global Positioning System (or "GPS") sensor configured to obtain information regarding a position of the smartphone 110.

The user interface 120A shown in FIG. 1 is associated with a word processing application and includes a menu bar 122A, a slider bar 124A and a set of text 126A presented thereon. The menu bar 122A is disposed in a default location at an upper border of the user interface 120A for selecting one or more interactive options associated with the word processing application. The slider bar 124A is provided in a default location along a right border of the user interface 120A for translating content within the user interface 120A. The set of text 126A is provided in a default font and size, and may be entered by any means (e.g., manual entry by way of a physical or virtual keyboard, scripted manual entry, dictation).

The systems and methods of the present disclosure are directed to providing adaptive user interfaces that may change their respective layouts or configurations based on attributes, information or data (e.g., intrinsic or extrinsic) that may be captured or identified regarding a user, a software application or a computing device, such as by the sensors 116-1 through 116-7 on the smartphone 110 of FIG. 1. Accordingly, based on the information or data, the layout or configuration of the user interface 120A may be modified into the layout or configuration shown in the user interface 120B, in which the menu bar 122B is disposed along a bottom border of the user interface 120B. Additionally, as is also shown in FIG. 1, the user interface 120B includes the slider bar 124B along a left border of the user interface 120B, and the set of text 126B is of a larger size and different font than the set of text 126A in the user interface 120A.

The systems and methods of the present disclosure may operate by detecting information or data regarding one or more attributes of a user of any kind (e.g., ages, locations, occupations, marital status, numbers of children, educational backgrounds or personal experiences), or operational characteristics or environmental conditions associated with a software application or a computer device, from any source, and also by detecting any actions or steps taken by the user to establish or modify a layout or configuration of the software application or the computer device. Once the information or data have been captured, and the actions or steps have been determined, the systems and methods disclosed herein may identify any number or type of covariances, e.g., measures of the extent to which two seemingly unrelated variables may change in concert, with regard to a particular layout or configuration of a software application or a computer device, or to one or more aspects of such a layout or configuration.

For example, where one or more of the systems or methods disclosed herein is provided in connection with a mobile device (e.g., a smartphone or tablet computer) or an application operating thereon, attributes regarding a user of the mobile device may be determined by any means, and information or data may be captured from any sensors or sources that may be accessed by the mobile device. Some such attributes may include an identity of the user, a level of experience of the user with regard to a particular software application or computer device, or any other factor that is known or may become known regarding the user. Some such information or data may include, for example, ambient light levels, network connectivity bandwidths or strengths, accelerations, velocities, angular orientations, angular velocities, ambient sound levels, temperatures or locations, such as the information or data shown in FIG. 1 as being captured by the sensors 116-1 through 116-7, or any other relevant information or data regarding a software application or a computer device, or the operation thereof.

Once the attributes of the user, or the information or data regarding the software application or the mobile device, are determined, such information may be processed, correlated, clustered or grouped with regard to one or more layouts or configurations, or actions taken in order to establish or modify a layout or a configuration, of either the software application or the mobile device. Such attributes and information or data may be processed according to any number of machine learning applications or techniques, including but not limited to collaborative filtering techniques, e.g., by identifying preferences as to layouts or configurations of software applications or computer devices of other users, as well as closed association rule mining (or "CHARM") techniques or label propagation algorithms, or frequent item set mining algorithms or clustering algorithms such as an Apriori algorithm or a k-means clustering algorithm in accordance with the present disclosure, in order to identify a preferred or appropriate configuration, or actions required in order to establish such a preferred or appropriate configuration, of the software application or the computer device.

For example, where a variable A represents a value corresponding to an event or condition associated with a user, a software application or a computer device, and a variable B represents a value corresponding to another event or condition associated with the user, the software application or the computer device, the values of A and B may be tracked and correlated with a variable C corresponding to a particular configuration of the software application or computer device historically observed as being established or modified by users of the software application or the computer device, or historically observed steps taken by such users too establish or modify the particular configuration. A covariance matrix may be generated by an analytical engine or covariant metrics comparison engine or like module, based on the values of A and B, and the probability that a configuration C may be established or modified as functions of the values of A and B, as determined from such historical observations.

Subsequently, when events or conditions corresponding to the variables A and B are observed from a user, a software application or a computer device, and the values of A and B reach or exceed one or more predetermined thresholds as defined by the covariance matrix, the layout or configuration of the software application or the computer device may be automatically adapted to the configuration C in accordance with the present disclosure. Those of ordinary skill in the pertinent arts will recognize that the number of events or conditions, and the number of layouts or configurations, or the number of steps taken to establish such layouts or configurations that may be considered in accordance with the present disclosure are not limited. Further, the analytical engines or covariant metrics comparison engines of the present disclosure, which may comprise any number of software applications or computer hardware components, need not acknowledge or understand the differences between respectively observed events or conditions (e.g., whether the observed event or condition is a temperature or a velocity), but need only understand how the events or conditions impact user decisions as to layouts or configurations of user interfaces. Once an understanding of such user decisions is made, future observances of such events and conditions may automatically trigger a change in a layout or a configuration of a user interface in a manner that is consistent with such previously observed user decisions.

Additionally, the information or data regarding operational characteristics or environmental conditions may be filtered in order to identify particularly relevant information or data with regard to particular layouts or configurations, or to remove duplicate instances of the information or data or any noise from consideration. Moreover, one or more Pareto observations may be performed on such information or data in this regard, in order to further determine which attributes of a user, or which elements of information or data regarding operational characteristics or environmental conditions, are particularly dispositive as to one or more layouts or configurations of a user interface.

The systems and methods of the present disclosure may be used to automatically cause a user interface to adapt based on an identification of user attributes, operational characteristics, environmental conditions which imply a specific layout or configuration that may be preferred. Some changes to layouts or configurations of a user interface that may be implemented in accordance with the present disclosure include the placement of menus, buttons or other interactive features of a software application, as well as attributes of information expressed in such user interfaces (e.g., font sizes or styles, or page orientations), or operational considerations of a computer device (e.g., backlighting on a computer display, volume levels for sounds emitted by a speaker, or durations or intervals of sleep timers or automatic locks). Moreover, the determinations as to whether a change in a layout or a configuration is required in view of any detected user attributes, operational characteristics or environmental conditions may be made in a client-side application or component, or a server-side application or component, and such changes may be implemented in real time or in near-real time (e.g., nearly instantaneously regarding a specific user interface, or upon a rollout of patches or modifications to software applications or computer devices in the future).

For example, when a covariance matrix or statistical algorithm or formula has been defined, the matrix, algorithm or formula may be provided to a rendering engine (or layout engine) or like module for causing the display of a user interface in a particular layout or configuration. Thus, once attributes, information or data associated with a user, a software application or a computer device are identified, such attributes, information or data may be provided to the rendering engine, and a user interface associated with the software application or the computer device may be rendered in accordance with a preferred layout or configuration on a computer display. The rendering engine may perform any necessary calculations or determinations regarding such attributes, information or data in order to identify the preferred layout or configuration, which may be provided to one or more software applications or computer devices accordingly. For example, where a preferred layout or configuration of a user interface for a word processing application that calls for menu options or interactive features to be placed in particular locations or orientations is determined based on a specific location of a computer device operating the word processing application, an orientation of the computer device, or an ambient light condition in a vicinity of the computer device, menu options or interactive features associated with other applications, such as web browsers, spreadsheets, media playing applications or any other software application operating on the computer device or on other computer devices that are in the same or a similar location, may be provided at the same or similar orientations, or subject to the same or a similar ambient light condition.

The systems and methods of the present disclosure may be provided in any environment in which a software application is provided for use by one or more users of a computer device who may have different preferences for the layout or configuration of the features associated with the software application or the computer device in one or more user interfaces. In particular, the systems and methods disclosed herein may be utilized in connection with a general purpose software application such as a spreadsheet, a web browser, a word processor or a presentation application, or a general purpose computer device such as a smartphone, a tablet computer, a laptop computer or a desktop computer. Alternatively, the systems and methods disclosed herein may be utilized in connection with software applications or hardware devices that have been custom-designed or built for one or more special purposes. For example, in an electronic commerce environment, where large numbers of items that are made available for purchase from an online marketplace are stored in a fulfillment center, one or more of the adaptive user interfaces described herein may be provided in connection with various applications operating on a dedicated handheld computer, including but not limited to applications for checking inventory levels, applications for researching purchase orders and purchase order histories, or applications for performing any other relevant tasks. Similarly, the systems and methods of the present disclosure may also operate on a client-side system or application, e.g., to preconfigure a web browser on a computer device, or on a server-side system or application, e.g., to preconfigure a web site or a server on which the web site is hosted, according to one or more preferences of a user.

Those of ordinary skill in the pertinent art will recognize that the systems and methods of the present disclosure may operate on any type of hardware component or machine, or in connection with any form of software application, that presents a user interface of any size or shape to one or more users. Some such machines may include, but are not limited to, media players or media playing applications, mobile telephones or mobile telephone applications, copier machines or facsimile machines, automated teller machines (or ATM) or any other machine providing an interactive user interface that may configured according to the preferences of one or more users.

The systems and methods of the present disclosure may be provided for use by a particular computing platform (e.g., a desktop computer, a laptop computer, a handheld device, a smartphone), or by one or more applications or operating systems operating thereon. Some embodiments of the present disclosure may be provided in a single library (e.g., a reusable piece of code that may take a different form based on an operating system or programming language) maintained in one or more data stores that may be accessed by one or more applications operating on the particular computing platform, or on other computing platforms utilizing a similar or compatible operating system. For example, a library may receive a number of inputs (e.g., extrinsic data such as a location of the computing platform or ambient light or sound conditions in a vicinity of the computing platform, as well as intrinsic data such as a type of the computing platform, an application or operating system running on the computing platform at a given time or day), and one or more modeling algorithms within the library may generate outputs regarding associations between the configurations of the computing platform or one or more applications, or changes to any such configurations, with regard to any of the inputs. Additionally, information regarding such associations (e.g., the inputs and outputs) may be transmitted from the library to an external server, which may conduct further processing in order to identify one or more covariants that may be associated with a given configuration, or a change in such a configuration.

Figure 2:
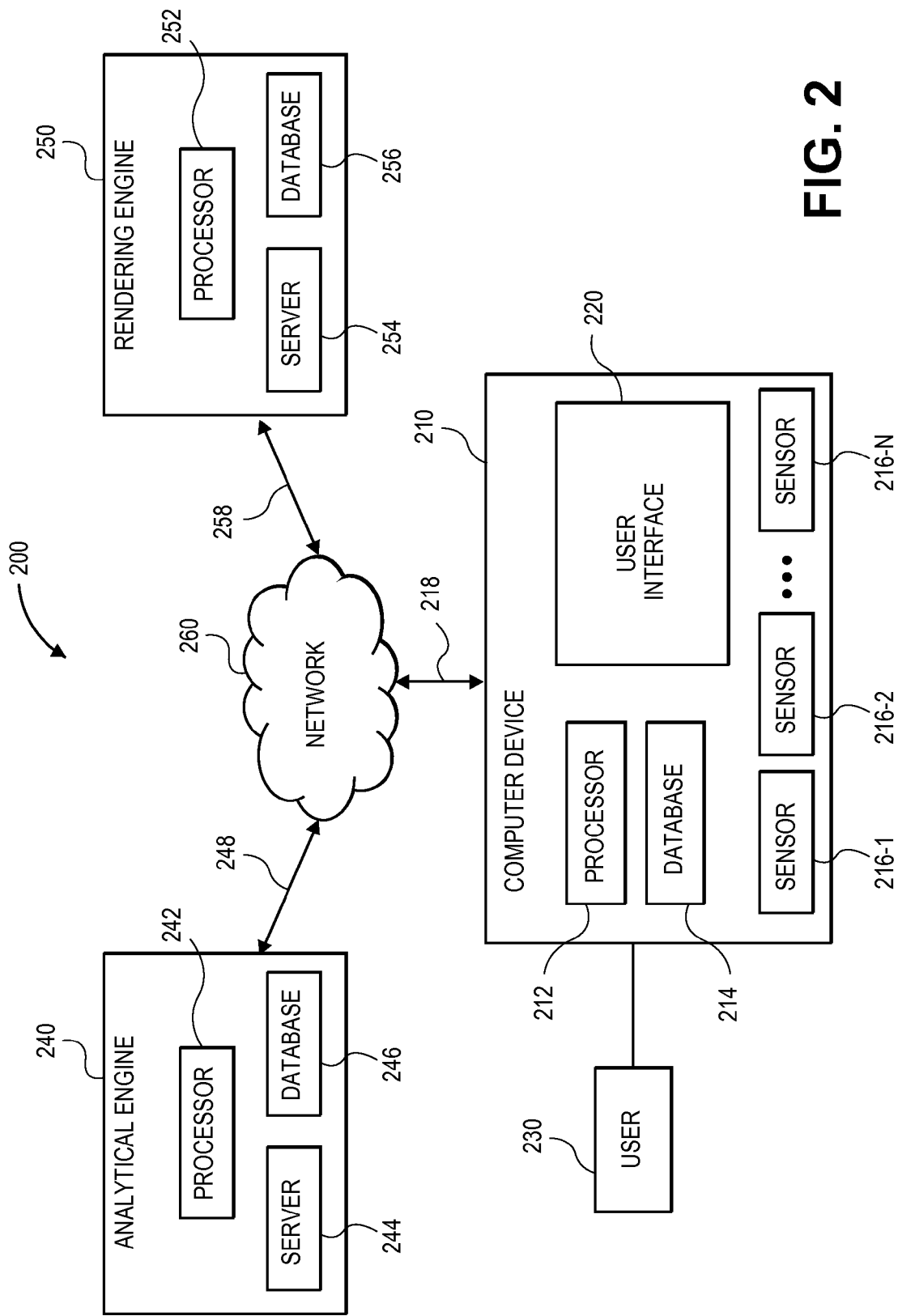
FIG. 2 is a block diagram of an illustrative system for providing adaptive user interfaces in accordance with embodiments of the present disclosure.

Referring to FIG. 2, a block diagram of one system 200 for providing adaptive user interfaces in accordance with embodiments of the present disclosure is shown. Except where otherwise noted, reference numerals preceded by the number "2" shown in FIG. 2 indicate components or features that are similar to components or features having reference numerals preceded by the number "1" shown in FIG. 1.

As is shown in FIG. 2, the system 200 includes a computer device 210 operated by a user 230, an analytical engine 240 and a rendering engine (or layout engine) 250 that are connected to one another across a network 260, such as the Internet.

The computer device 210 may be any device that includes one or more hardware components that may be specifically programmed or adapted for performing a specific purpose, or a general purpose device including but not limited to a desktop computer, a laptop computer, a tablet computer, a personal digital assistant, a digital media player or a smartphone, and may include any form of input and/or output peripherals or accessories such as scanners, readers, keyboards, keypads, touchscreens or pointing devices. The computer device 210 may also be provided in connection with various other components or apparatuses, such as automobiles, wristwatches, home appliances, industrial machinery or the like. Additionally, the computer device 210 may be provided in a fixed location or may be portable, and may even be worn on a human body. Moreover, the computer device 210, or any other like machines utilized by the user 230 or by other users (not shown) may be connected to or otherwise communicate with the analytical engine 240, the rendering engine 250 or other computer devices over the network 260, as indicated by line 218, by the transmission and receipt of digital data.

As is shown in FIG. 2, the computer device 210 includes one or more processors 212, one or more databases 214, a plurality of n sensors 216-1, 216-2 . . . 216-n and a user interface 220. The processors 212 may control, command or instruct any number of operations to be performed by the computer device 210, while the database 214 may be configured to receive and store information or data of any kind or type, such as information or data relating to the rendering of content on the user interface 220, including images, media files or sets of alphanumeric characters or symbols, at the direction of one or more software applications operating on the computer device 210.

The sensors 216-1, 216-2 . . . 216-n may be any type or form of sensor configured to capture or otherwise determine information or data regarding the computer device 210, the user 230, or an environment in which the computer device 210 or the user 230 is situated. For example, as is discussed above with regard to FIG. 1, the sensors 216-1, 216-2 . . . 216-n may include, but are not limited to, one or more optical sensors (e.g., cameras), wireless transceivers, accelerometers, gyroscopes, microphones, thermometers or other temperature sensors or heat sensors, or GPS sensors or other location sensors, as well as cellular transceivers, bar code readers, radiation sensors or any other component that may sense information or data automatically or in response to one or more instructions, and generate or transmit one or more digital or analog signals in response or relating to the sensed information or data.

The user interface 220 may be any form of visual interactive display feature or means that permits the user 230 to interact with the computer device 210. The user interface 220 may be graphical in nature, and provided by one or more software applications operating on the computer device 210. The user interface 220 may comprise any number of graphical controls or elements such as menu bars; tools or tool bars; windows or other displays in fixed or adjustable positions; or buttons, icons or other interactive elements which permit the user 230 to manipulate or control any aspect of the computer device 210 or any software applications operating thereon. Typically, a user interface 220 is rendered upon a computer display provided in connection with the computer device 210. Such computer displays may have any size or shape, including but not limited to displays as small as a face of a wristwatch or an optical element of a pair of glasses, or as large as a ribbon board mounted in a stadium or arena. Such computer displays may take the form of cathode ray tube screens, light-emitting diode screens, liquid-crystal display screens, touchscreens (e.g., capacitive or resistive) and the like, as well.

The analytical engine 240 may be any form of software application or computer device component that is configured to receive and analyze information or data from various sources, including but not limited to the computer device 210, and to identify relationships (e.g., covariances or other correlative links) between one or more elements of the information or data. As is shown in FIG. 2, the analytical engine 240 comprises one or more processors 242, one or more physical servers 244 and one or more databases 246 or other data stores. The analytical engine 240 may be connected to or otherwise communicate with the computer device 210, the rendering engine 250 or other computer devices over the network 260, as indicated by line 248, by the transmission and receipt of digital data.

As is discussed above, the analytical engine 240 may receive information or data regarding attributes of the user 230 or other users of other computer devices (not shown), operational characteristics of the computer device 210 or any software applications operating thereon, or environmental conditions in a vicinity of the user 230 or the computer device 210. The analytical engine 240 may also receive information or data regarding actions taken by the user 230 of the computer device 210, or other users of other computer devices (not shown), to lay out or configure one or more user interfaces or software applications operating on such computer devices. The analytical engine 240 may be configured to analyze the user attributes or information or data regarding the operational characteristics or environmental conditions, and the information or data regarding the actions taken by users, in order to identify any relationships or correlations between such user attributes, operational characteristics and environmental conditions, and such actions, layouts or configurations. For example, the analytical engine 240 may filter or process such attributes, information or data according to one or more other learning algorithms, formulas or techniques, e.g., CHARM techniques, label propagation algorithms, frequent item set mining algorithms or clustering algorithms such as Apriori or k-means clustering algorithms.

The rendering engine 250 may be any form of software application or computer device component that is configured to receive and analyze information or data from various sources, such as the analytical engine 240, and to cause a rendering of one or more user interfaces that may be associated with a software application or computer device in response to such information or data. For example, as is discussed above, the rendering engine 250 may be configured to receive instructions or services for rendering one or more user interfaces based on inputs received directly from the computer device 210 or from other computer devices (not shown), or indirectly from the analytical engine 240 or another source over the network 260. Such rules may define any aspect of the layout or configuration of a user interface associated with any type or form of software application operating on the computer device 210 or one or more other computer devices. The rendering engine 250 may be connected to or otherwise communicate with the computer device 210, the analytical engine 240 or other computer devices over the network 260, as indicated by line 258, by the transmission and receipt of digital data.

As is discussed above, the rendering engine 250 may render information regarding any type of requested software application or operating system and its associated content on the user interface 220 based on information or data received from the software application or the computer device 210. For example, in a web browser, a rendering engine usually receives files or documents programmed in Hypertext Markup Language ("HTML") code from a server-side application, parses such files into a Document Object Model (or "DOM") tree, determines any styles or building frames of a layout or configuration for the content, and adds one or more attributes to the layout or configuration in a process commonly called "painting." The rendering engine 250 may also receive files or documents in other formats, and may further establish or modify layouts or configurations of the user interface 220 in a manner defined by any other type or form of software applications other than web browsers (e.g., word processors, spreadsheets, presentation applications), or by the computer device 210. The rendering engine 250 may thus cause user interfaces 220 associated with different software applications or computer devices to appear with similar layouts or configurations on a computer display, despite any functional or fundamental differences between such software applications or such computer devices.

The computers, servers, devices and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein. Also, those of skill in the pertinent art will recognize that the user 230, or other users (not shown) may use a keyboard, keypad, mouse, stylus, touch screen, or other device (not shown) or method for interacting with the computer device 210 or any software applications operating thereon, or to "select" an item, link, node, hub or any other aspect of the present disclosure. Moreover, process elements described as being performed by a "computer device," an "analytical engine," or a "rendering engine," or like terms, may be automated elements performed by their respective computer systems or devices, or implemented within software applications or modules (or computer programs) executed by one or more computer systems or devices. Specially designed hardware could, alternatively, be used to perform certain operations.

For example, the user 230 may use any software, network-enabled or network applications operating on the computing device 210, such as a web browser or any other client-server applications (e.g., dedicated shopping applications or other software) or features including electronic mail (or E-mail), short or multimedia messaging service (SMS or MMS) text messages, social networking messages or postings, or other messaging techniques to communicate with (or connect to) one or more other computer devices through the network 260. In addition to the computer device 210, computing devices utilized by customers in accordance with the present disclosure may be any of a number of computer-related devices that are capable of communicating over the network 260, including but not limited to set-top boxes, personal digital assistants, digital media players, network pads, desktop computers, televisions, automobile entertainment systems, appliances, gaming consoles or controllers, electronic book readers, and the like. Similarly, display screens of the computer device 210, or of other computer devices, may take any form, e.g., cathode ray tubes screens, light-emitting diode screens, liquid-crystal display screens, touchscreens and the like.

The protocols and components for providing communication between the computer device 210 and/or any software applications operating thereon, the analytical engine 240 and/or the server 244 or the rendering engine 250 and/or the server 254 are well known to those skilled in the art of computer communications and thus, need not be described in more detail herein.

The data and/or computer executable instructions, programs, firmware, software and the like (also referred to herein as "computer executable" components) described herein may be stored on a non-transitory computer-readable medium that is within or accessible by the computer device 210, the analytical engine 240 or the rendering engine 250, and having sequences of instructions which, when executed by a processor (such as a central processing unit, or CPU), cause the processor to perform all or a portion of the functions and/or methods described herein. Such computer executable instructions, programs, software and the like may be loaded into the memory of the computer device 210, the analytical engine 240 or the rendering engine 250 using a drive mechanism associated with the non-transitory computer readable medium, such as a floppy drive, CD-ROM drive, DVD-ROM drive, network interface, or the like, or via external connections.

Some embodiments of the systems and methods of the present disclosure may also be provided as a computer executable program module including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read only memories (EPROMs), electrically erasable programmable read only memories (EEPROMs), flash memory, magnetic or optical cards, solid-state memory devices, or other types of media/machine-readable medium that may be suitable for storing electronic instructions.

For the purposes of illustration, some of the systems and methods disclosed herein may be referenced primarily in the context of rendering user interfaces associated with specific software applications such as word processors or browsers. As will be recognized by those of skill in the art, however, the systems and methods disclosed herein may also be used in many other situations, and with regard to any type of software application or computer device that may render any form of user interface presented on any computer device, and are not limited to any of the embodiments described herein.

Figure 3:
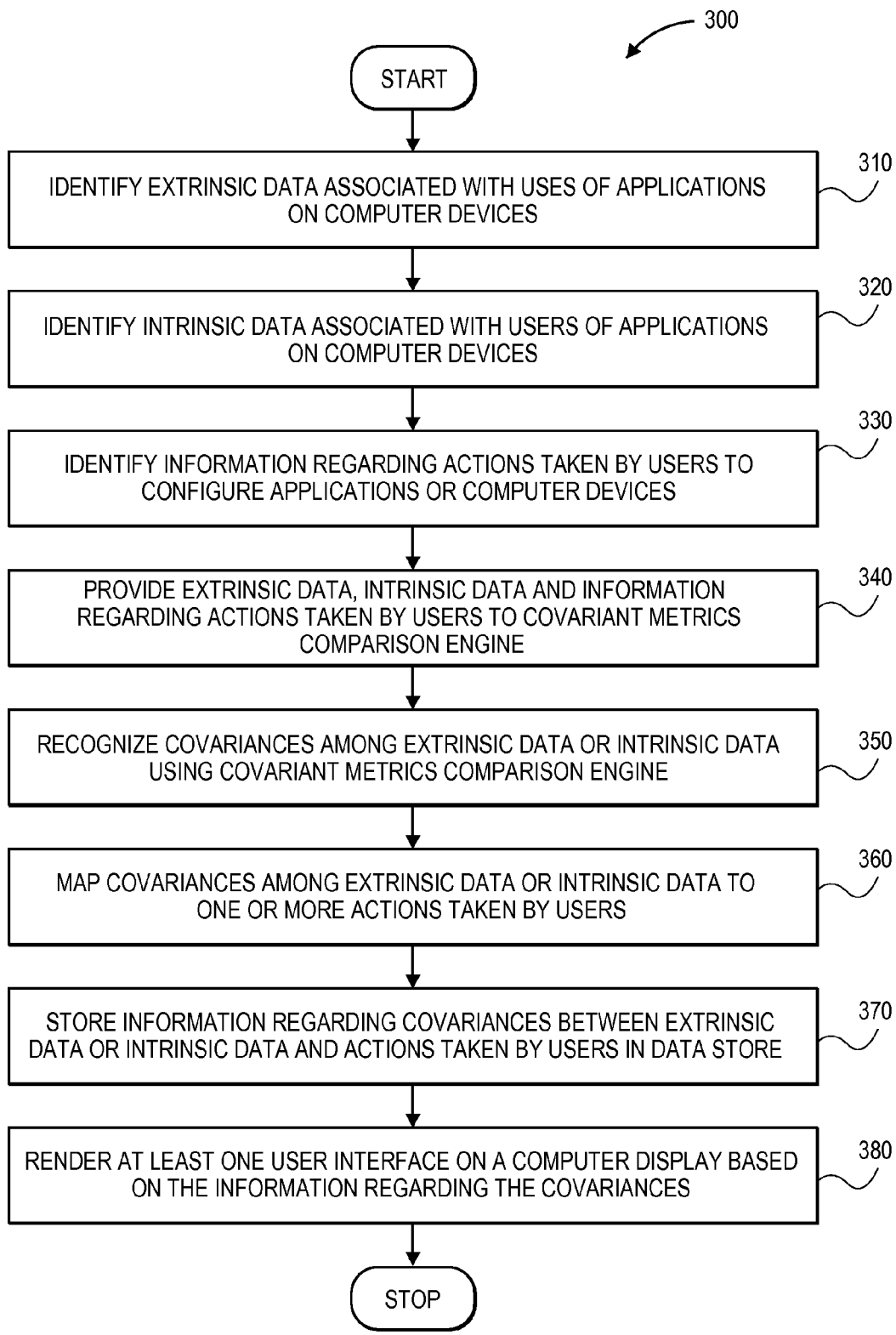
FIG. 3 is a flow chart of an illustrative process for providing adaptive user interfaces in accordance with embodiments of the present disclosure.

As is discussed above, the systems and methods of the present disclosure may provide one or more adaptive user interfaces that may be configured based on any statistical relationships between attributes of a user or operating characteristics or environmental conditions of a software application or computer device and estimated or predicted preferences of the user, or like users, for a layout or configuration of the software application or the computer device. Referring to FIG. 3, a flow chart 300 of one illustrative process for providing adaptive user interfaces in accordance with embodiments of the present disclosure is shown.

At box 310, extrinsic data associated with uses of applications on computer devices is identified. Such extrinsic data may reference any aspect of the operation of the applications or the computer devices, or environments in which the applications or the computer devices are operated. For example, referring again to FIG. 1, the extrinsic data may be determined from the one or more sensors 116-1 through 116-7, and may comprise any relevant information regarding the smartphone 110 such as light conditions, network connectivity, accelerations, velocities, sound conditions, temperatures, locations or the like. At box 320, intrinsic data associated with users of such applications on such computer devices is also identified. For example, such intrinsic data may identify the users, or their roles or functions within a business or organization, as well as any relevant experience in operating one or more of the applications or the computer devices.

At box 330, information regarding actions taken by such users to configure such applications on such computer devices is also identified. For example, where such users elected to increase a font size or a level of backlighting on a computer device in response to poor lighting conditions, to increase a volume level on the computer device in response to adverse ambient sound levels, or to align a menu associated with a word processing document in a first orientation (e.g., vertical) when preparing an advertisement flyer and in a second orientation (e.g., horizontal) when writing a short story, and any other actions taken to modify the layout or configuration of user interfaces displayed by such applications on such computer devices may be determined. Similarly, where such users in a first location elected to view a user interface associated with a browser in a portrait orientation, and where users in a second location elected to view the user interface in a substantially horizontal, or landscape orientation, any such actions taken to modify the orientation of the user interface on the computer devices may be determined.

At box 340, the extrinsic data identified at box 310, the intrinsic data identified at box 320 and the information regarding the configuration actions taken by users identified at box 330 are provided to an analytical engine, such as a covariant metrics comparison engine. At box 350, the covariant metrics comparison engine may identify any number or form of relevant covariances among the extrinsic data or the intrinsic data, and at box 360, any such covariances may be mapped to one or more actions taken by the users. For example, where users of browsers operating on computer devices in remote locations or with low network connectivity request to view network pages (e.g., web pages) without images, a covariance between a remote location of a computer device, and a low network connectivity level of the computer device, may be identified, and may be mapped to a layout or configuration of a browser that displays content in a low-resolution or reduced-data format. Any covariances may be identified between any elements of information or data, and mapped to any action taken by a user with regard to a layout or a configuration of a user interface, in accordance with the present disclosure.

At box 370, information regarding the covariances between such extrinsic data or intrinsic data and the actions taken by users to which such covariances are mapped may be stored in at least one data store. Such information or data may be further utilized to identify preferred layouts or configurations of user interfaces on any kind or type of computer device, based on any extrinsic data or intrinsic data that may be identified regarding a user, a software application or the computer device. At box 380, a user interface associated with one of the software application or the computer device is rendered on a computer display based at least in part on the information regarding the covariances, and the process ends.

Figure 4:
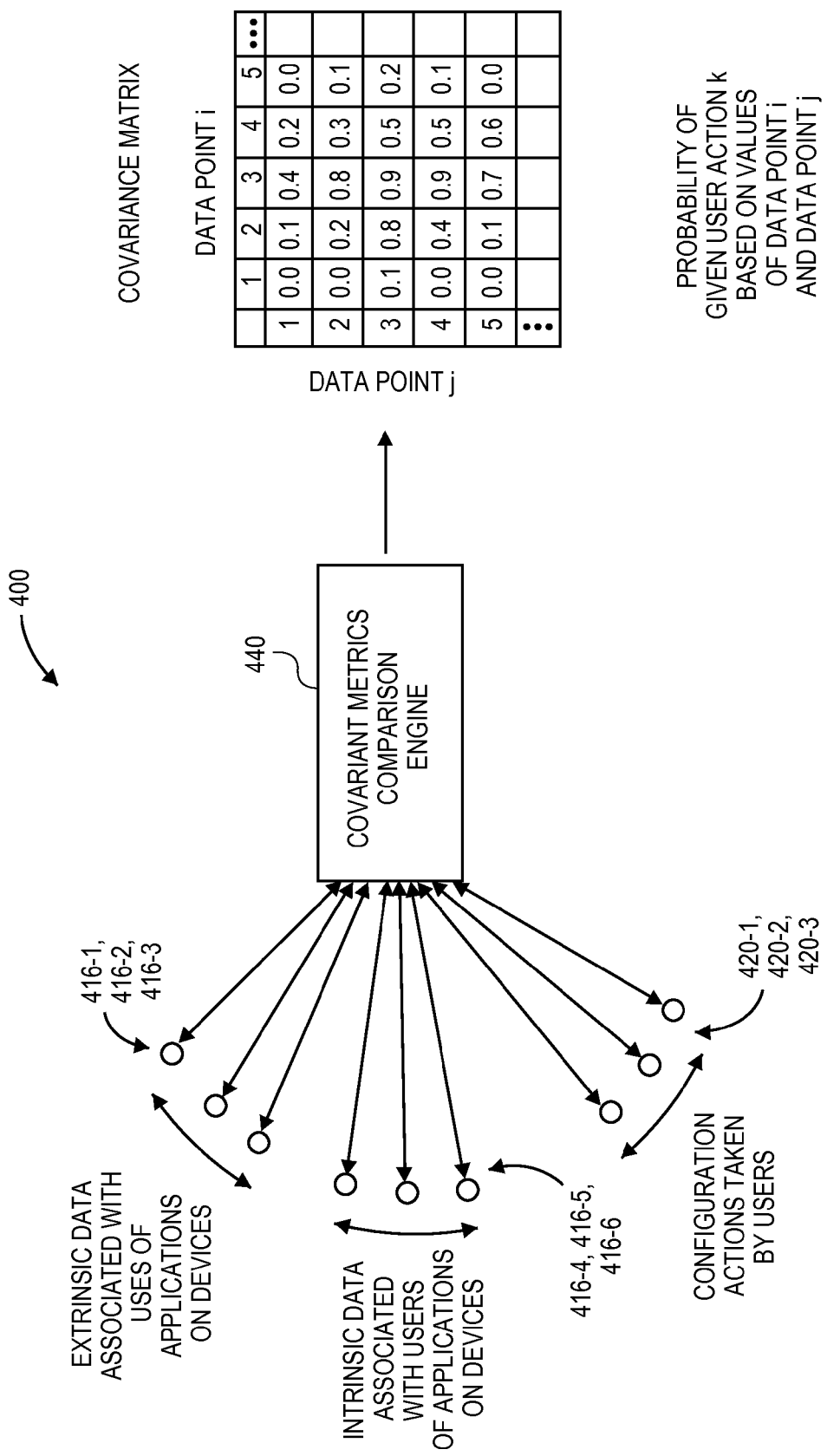
FIG. 4 is a presentation of data interpreted in order to provide adaptive user interfaces in accordance with embodiments of the present disclosure.

One process for analyzing extrinsic data or intrinsic data regarding users, software applications or computer devices with regard to actions taken by such users to configure user interfaces associated with such applications or devices is shown in FIG. 4. Referring to FIG. 4, a flow diagram 400 of processes for providing adaptive user interfaces, such as the flow chart 300 of the illustrative process of FIG. 3, is shown. Various extrinsic data points 416-1, 416-2, 416-3 and intrinsic data points 416-4, 416-5, 416-6 may be fed to a covariant metrics comparison engine 440 or another form of analytical engine. The data points 416-1, 416-2, 416-3, 416-4, 416-5, 416-6 may be determined by any means or in any manner, such as by one or more of the sensors 116-1 through 116-7 of the smartphone 110 of FIG. 1.

Additionally, information regarding various actions 420-1, 420-2, 420-3 taken to configure a user interface may also be fed to the covariant metrics comparison engine 440. Within or by the covariant metrics comparison engine 440, any number of covariances between the respective data points 416-1, 416-2, 416-3, 416-4, 416-5, 416-6 are identified. Such covariances may be presented in a covariance matrix or array that includes probabilities that a given configuration action k is taken specific values of two or more such data points i and j are observed. The configuration matrix thus created may be provided to a rendering engine, such as the rendering engine 250 of the system 200 of FIG. 2, as part of a rules set that identifies one or more preferred layouts or configurations of a user interface based on any extrinsic data or intrinsic data that may be identified regarding a user of one or more software applications operating on one or more computer devices in the future.

Moreover, although the covariance matrix shown in FIG. 4 is expressed as a two-dimensional matrix, those of ordinary skill in the pertinent arts will recognize that relations between any number of data points or type of information or data may be expressed in a multi-dimensional covariance matrix or array and correlated with one or more actions taken by users to configure a software application or a computer device in accordance with the present disclosure.

Figure 5:
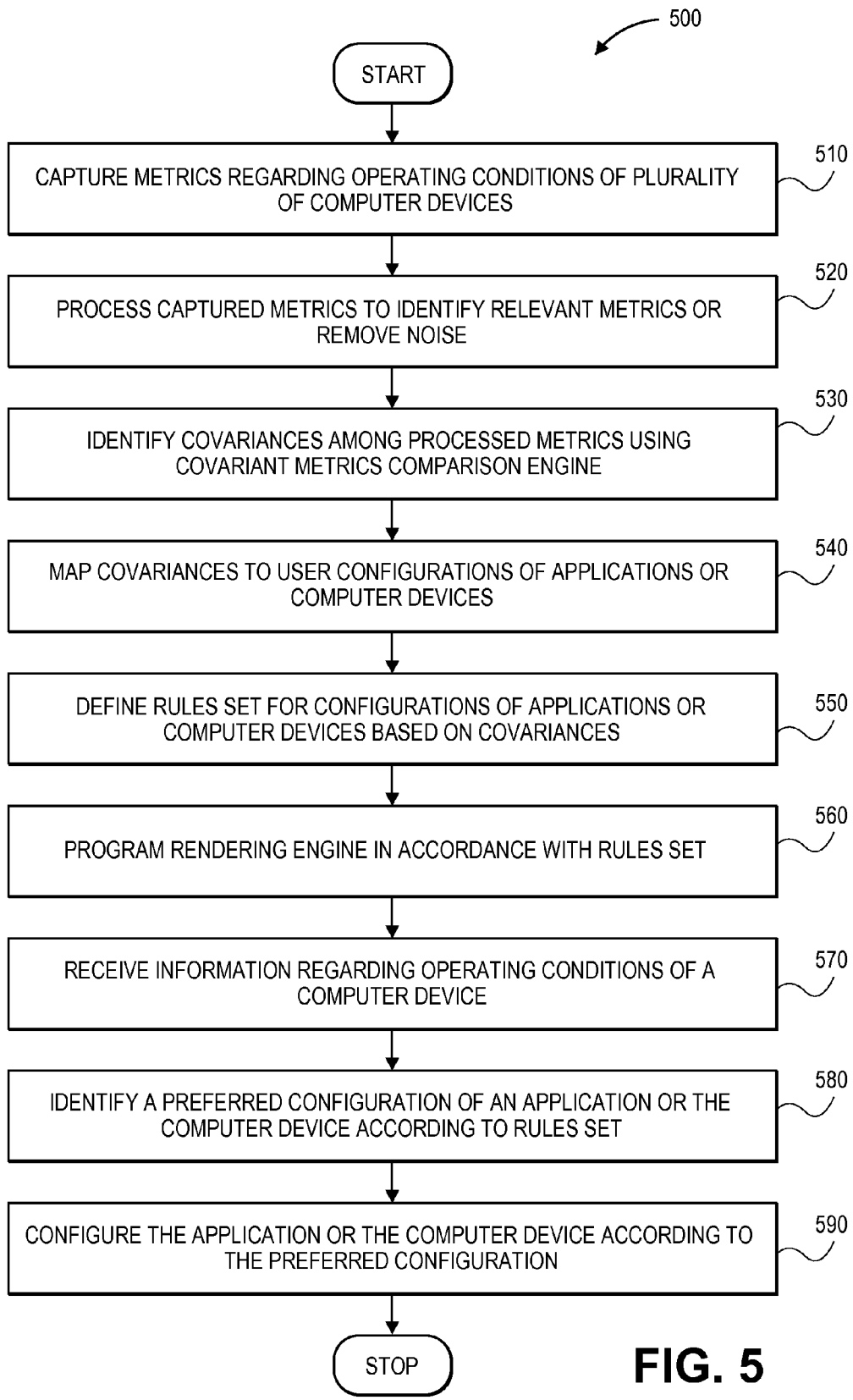
FIG. 5 is a flow chart of an illustrative process for providing adaptive user interfaces in accordance with embodiments of the present disclosure.

As is discussed above, once one or more relationships (e.g., covariances) have been identified between various elements or points of extrinsic data and intrinsic data, and mapped to actions taken by users in order to configure a user interface, the relationships between such data may be mapped or otherwise associated with such actions. Therefore, where such relationships are observed in the future from a user of a software application operating on a computer device, instructions for configuring a user interface in a manner consistent with the mapped actions may be automatically provided to the software application or the computer device, and a user interface may be automatically configured thereby. Referring to FIG. 5, a flow chart 500 of one illustrative process for providing adaptive user interfaces in accordance with embodiments of the present disclosure is shown.

At box 510, metrics regarding the operating conditions of a plurality of computer devices are captured, e.g., by one or more sensors, such as the sensors 116-1 through 116-7 of the smartphone 110 of FIG. 1, or any other sensors. At box 520, the captured metrics are processed in order to identify one or more relevant metrics, and to remove any "noise" in the form of duplicative or irrelevant metrics. Such processing may comprise a Pareto observation or any other form of filtering or processing of such metrics.

At box 530, one or more covariances among the metrics are identified using a covariant metrics comparison engine. For example, the metrics may be clustered according to one or more algorithms, such as a CHARM technique, an Apriori algorithm or a k-means clustering algorithm, in order to identify one or more covariances between such metrics. At box 540, the covariances identified at box 530 may be mapped to various user-defined configurations of general purpose or special purpose applications or computer devices. For example, where a user elects to configure a spreadsheet application to render large-sized cells or fonts on a computer display while the user is operating a computer device on a train, and small-sized cells or fonts on the computer display while the user is operating the computer device in an office, such actions may be mapped to covariances identified between velocities and locations of the computer device. Any relationship between any type of metric, including user attributes, operational characteristics or environmental conditions of a user, a software application or a computer device, or other extrinsic or intrinsic data, may be identified and mapped to one or more user-defined configurations.

At box 550, a rules set is defined for the configuration of applications on computer devices based on such covariances. For example, where a covariance between two elements of information or data regarding a user, a software application or a computer device is mapped to a user-defined configuration of the software application or the computer device, a rules set for configuring the software application or the computer device, or other software applications or computer devices, may be defined for instances in which the covariance is observed again in the future. At box 560, a rendering engine may be programmed in accordance with the rules set. The rendering engine may be directed to render a user interface associated with a single software application or computer device, or multiple software applications or computer devices, in a predetermined layout or configuration in response to one or more inputs that may be associated with captured metrics.

At box 570, information regarding operating conditions of a computer device is received. For example, the rendering engine 250 of FIG. 2 may receive inputs regarding light conditions, network connectivity, accelerations, velocities, angular orientations, angular velocities, sound levels or locations that may be obtained by one or more of the sensors 216-1, 216-2 . . . 216-n of the computer device 210, or any other relevant information or data regarding the operation of the computer device that may be determined by one or more sensors or by any other means. Such information may be received in connection with a request to initiate an application or to otherwise operate the computer device, or in any other context.

At box 580, a preferred configuration of an application or the computer device may be identified according to the rules set defined at box 550. For example, where one or more operating conditions are determined at box 570, the operating conditions and any other relevant data may be provided to the rules set, and a configuration that was previously established by one or more other users of software applications or computer devices under the same or similar operating conditions. At box 590, either the application or the computer device, or both, is configured based on the preferred configuration, and the process ends. For example, one or more user interfaces may be automatically rendered by the application or the computer device and displayed on a computer display in a manner consistent with configurations established by other users in the past.

Accordingly, the systems and methods of the present disclosure may determine any available information or data previously obtained regarding one or more users of software applications or computer devices, and identify any statistical relationships between such information or data relating to configurations of such applications or devices (e.g., configurations of one or more user interfaces operating thereon). Subsequently, when information or data regarding a user, a software application or a computer device is identified in the future, such information may be used to identify an appropriate configuration of the software application or the computer device, and to automatically implement the appropriate configuration. The systems and methods disclosed herein need not interpret the various elements of information or data that are subsequently observed, and need only recognize that such elements are the same as or similar to elements of information or data that were previously observed and associated with one or more configurations.

Figure 6A:
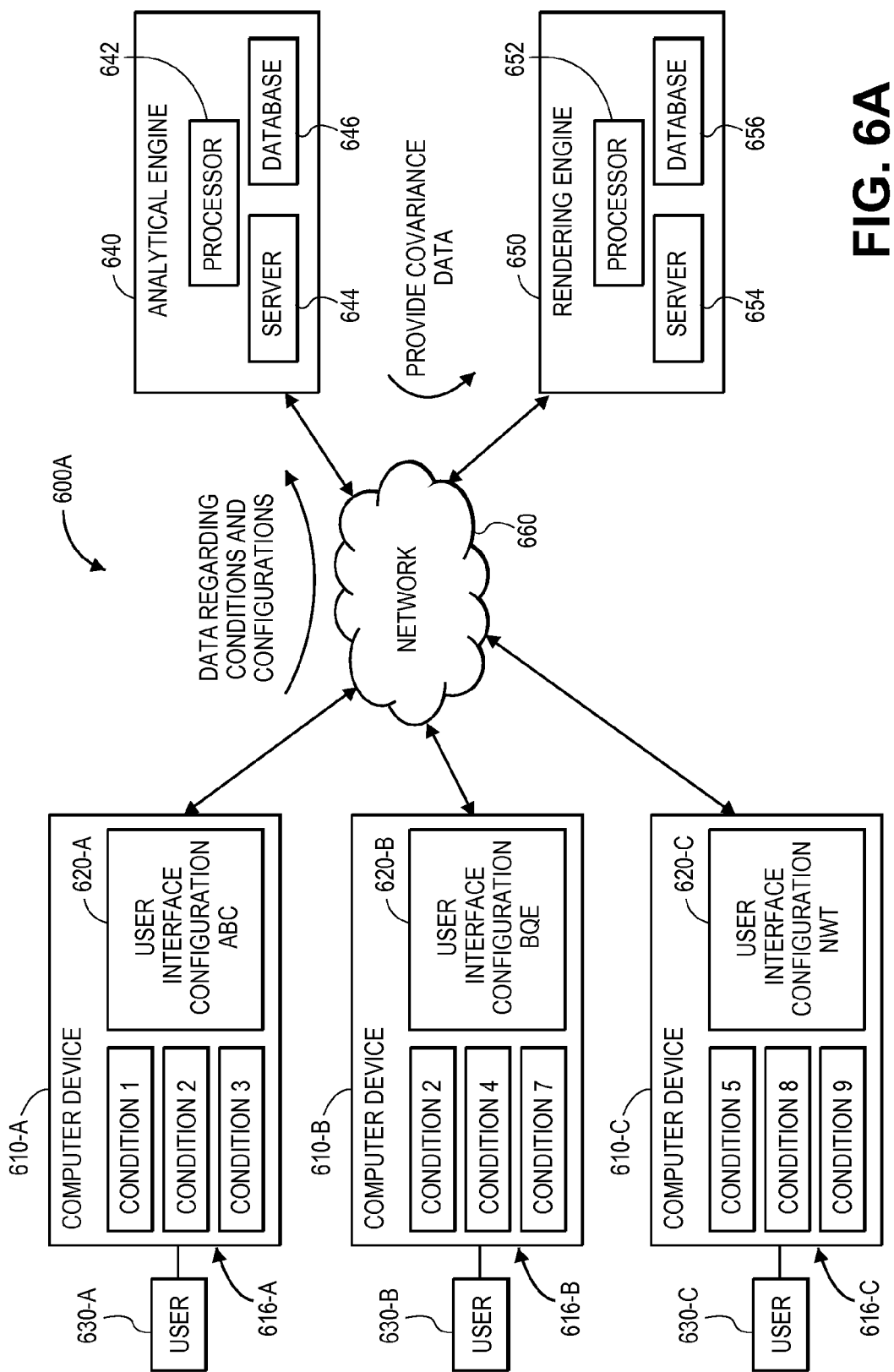
FIGS. 6A and 6B are block diagrams of illustrative systems for providing adaptive user interfaces in accordance with embodiments of the present disclosure.
Figure 6B:
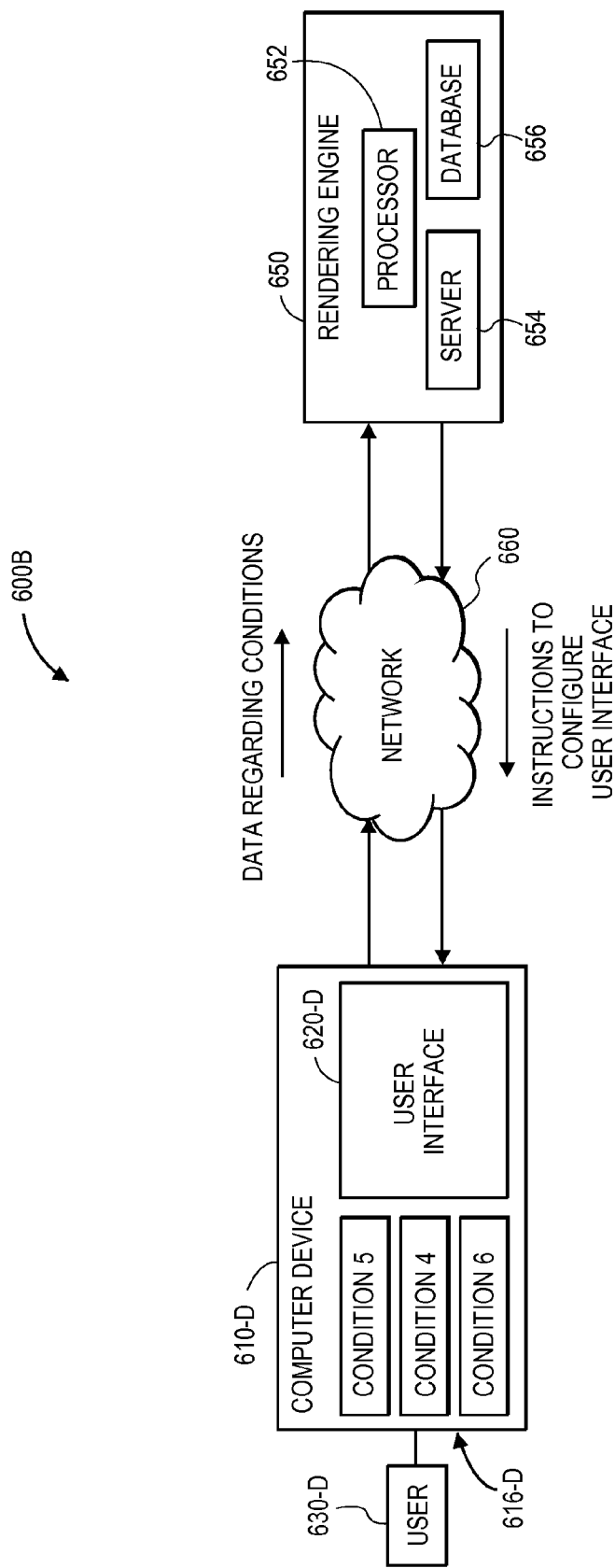

The automatic configuration of a user interface associated with a software application or a computer device based on information or data that may be obtained regarding a user of the software application or the computer device, or the software application or the computer device themselves, is shown with regard to FIGS. 6A and 6B. Referring to FIG.

6A, a block diagram of one system 600A for providing adaptive user interfaces in accordance with embodiments of the present disclosure is shown. Except where otherwise noted, reference numerals preceded by the number "6" shown in FIG. 6A or 6B indicate components or features that are similar to components or features having reference numerals preceded by the number "2" shown in FIG. 2.

As is shown in FIG. 6A, the system 600A includes a plurality of computer devices 610-A, 610-B, 610-C operated by users 630-A, 630-B, 630-C, an analytical engine 640 and a rendering engine 650 that are connected to one another across a network 660, such as the Internet. The computer devices 610-A, 610-B, 610-C are each operating subject to a plurality of conditions 616-A, 616-B, 616-C, and each features a user interface 620-A, 620-B, 620-C rendered thereon in a particular configuration.

As is shown in FIG. 6, information or data regarding the conditions 616-A, 616-B, 616-C of the computer devices 610-A, 610-B, 610-C, and the configurations of the user interfaces 620-A, 620-B, 620-C, may be provided to the analytical engine 640 over the network 660. For example, a log or record of the various operational characteristics or environmental conditions of the computer devices 610-A, 610-B, 610-C, and the configurations of the user interfaces 620-A, 620-B, 620-C or the computer devices 610-A, 610-B, 610-C or any software applications operating thereon, may be captured and forwarded to the analytical engine 640 either in real time, or in near-real time, or reported according to a predetermined schedule (e.g., daily, weekly, monthly). The log or record may indicate whether a default or preset configuration of the user interfaces 620-A, 620-B, 620-C was maintained by the respective users 630-A, 630-B, 630-C, or whether such users 630-A, 630-B, 630-C elected to modify or reconfigure the user interfaces 620-A, 620-B, 620-C in any way.

Once the log or record is received at the analytical engine 640, the information or data represented therein may be processed according to one or more algorithms, formulas or techniques in order to identify any covariances or other relationships between the conditions 616-A, 616-B, 616-C and the configurations of the user interfaces 620-A, 620-B, 620-C. When such covariances are identified, data regarding the covariances, e.g., the covariance matrix of FIG. 4, may be provided to the rendering engine 650 over the network 660 for further analysis. Subsequently, when one or more conditions regarding a user, a software application or a computer device are observed, such conditions may be provided to the rendering engine 650, which may recognize a preferred layout or configuration for a user interface on the computer device, and transmit instructions to the computer device to cause the user interface to be rendered in accordance with the preferred layout or configuration.

Referring to FIG. 6B, a system 600B for providing adaptive user interfaces in accordance with embodiments of the present disclosure is shown. The system 600B includes a computing device 610-D operated by a user 630-D, and the rendering engine 650 of the system 600A of FIG. 6A. The computing device 610-D is operating subject to a plurality of conditions 616-D and features a user interface 620-D.

According to the systems and methods of the present disclosure, information or data regarding user attributes, operating conditions or environmental characteristics may be provided to a rendering engine, which may then interpret such attributes, conditions or characteristics and identify a preferred layout or configuration for one or more user interfaces based on layouts or configurations of such user interfaces by users having the same or similar attributes, or software applications or computer devices having the same or similar operating characteristics or environmental conditions. Thus, once the data regarding the conditions 616-D of the computer device 610-D has been interpreted, a preferred layout or configuration for the user interface 620-D may be identified, and instructions for automatically configuring the user interface 620-D according to the preferred layout or configuration may be transmitted to the computer device 610-D. Alternatively, the instructions may be provided in the form of an upgrade to a software application or operating system (e.g., a patch) or in a new version of the software application or the operating system at a later time.

Additionally, as is discussed above, information or data regarding covariances between various attributes of a user, and operating characteristics or environmental conditions of a software application or a computer device, may be correlated with a layout or a configuration of a user interface of the software application or the computer device, and may be used to identify preferred layouts or configurations of other software applications or other computer devices operated by other users, even if such users, such software applications and such computer devices are unrelated to the original user, the original software application or the original computer device from which such information or data was obtained. The preferred layouts or configurations may be implemented on such other software applications or computer devices instantaneously (e.g., in real time or in near-real time), or as a part of a roll-out or phase-in process implemented by such other software applications or computer devices at some time in the future.

Figure 7:
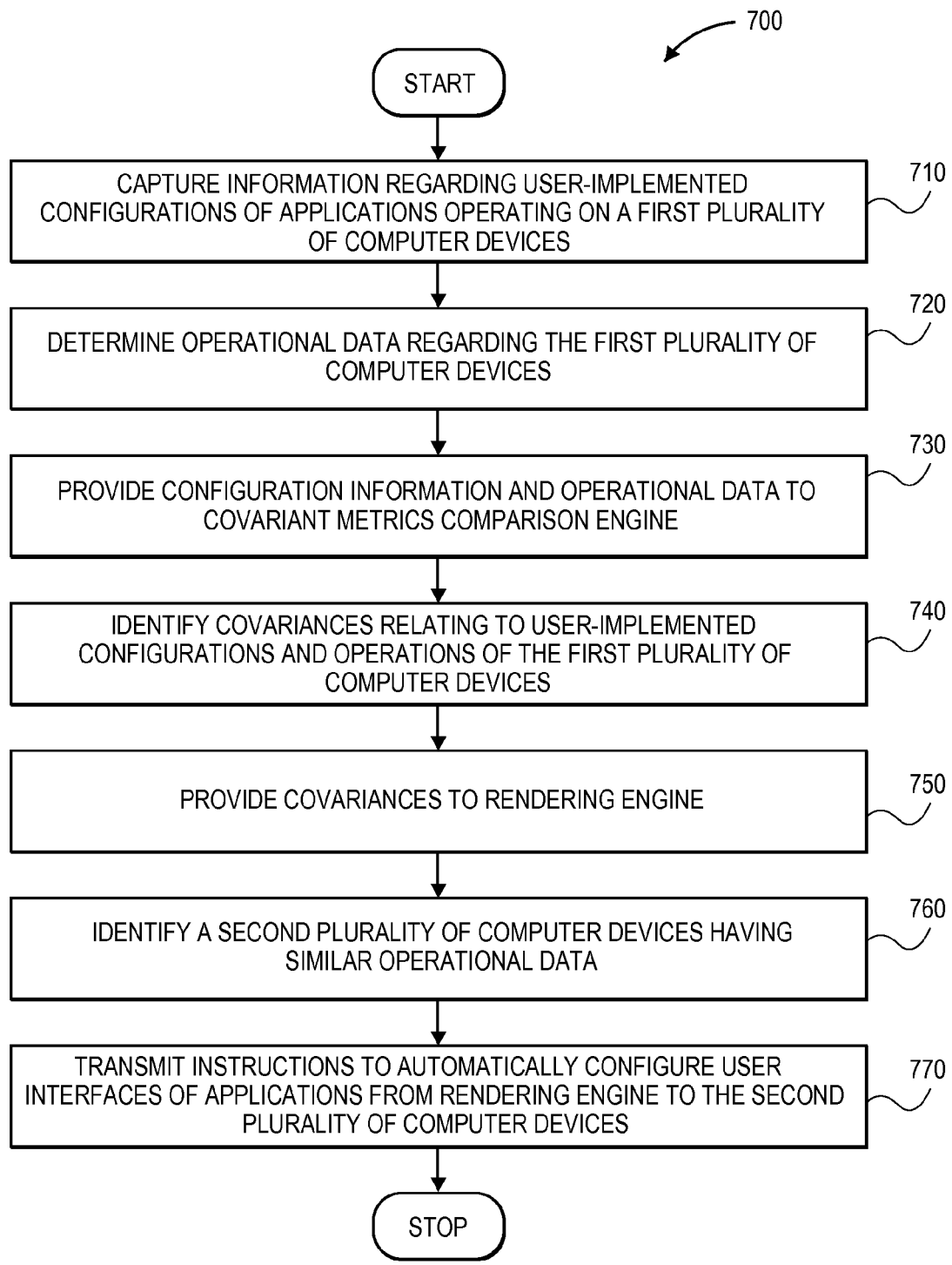
FIG. 7 is a flow chart of an illustrative process for providing adaptive user interfaces in accordance with embodiments of the present disclosure.

Referring to FIG. 7, a flow chart 700 of one illustrative process for providing adaptive user interfaces in accordance with embodiments of the present disclosure is shown. At box 710, information regarding user-implemented configurations of applications operating on a first plurality of computer devices is captured. The information may identify the layout or orientation of one or more interactive features, such as menu bars, tool bars, windows or other displays, buttons, icons or other interactive elements by such applications, e.g., in one or more user interfaces. At box 720, operational data regarding the first plurality of computer devices is determined. Such data may be obtained, for example, using one or more of the sensors 116-1 through 116-7 of the smartphone 110 of FIG. 1, or from any other source.

At box 730, the configuration information obtained at box 710 and the operational data regarding the first plurality of computer devices is provided to a covariant metrics comparison engine. At box 740, any number of covariances relating to the user-implemented configurations and the operations of the first plurality of computer devices may be identified. For example, any pairs of elements of information or data regarding the operation of the computer devices and the configurations of one or more user interfaces on the computer devices may be determined based on the configuration information and the operational data, such as window sizes of browsers used by online marketplace shoppers in Kentucky, or font styles or sizes typically selected by authors in Texas, may be determined.

At box 750, the covariances identified at box 740 are provided to a rendering engine. For example, the rendering engine may be programmed to render one or more user interfaces in a specific layout or configuration based at least in part on the observance of an input (e.g., a specific element of information or data), and the identification of an output (e.g., the specific layout or configuration) associated with one or more of the covariances. The covariances may be provided to the rendering engine in any form, such as a matrix or an array (e.g., the covariance matrix of FIG. 4) that may be interpreted by the covariances and used to identify a corresponding layout or configuration.

At box 760, a second plurality of computer devices having operational data that is similar to the operational data of the first plurality of computer devices are identified. For example, a group of smartphones operating in a specific location, a set of tablet computers having a particular level of connectivity or a number of handheld devices being used by a plurality of workers in a warehouse having similar attributes (e.g., roles, functions or experience levels) on a given day or time may be identified. At box 770, instructions for automatically configuring user interfaces of applications operating on the second plurality of computer devices are transmitted from the rendering engine to such devices, and the process ends. Such instructions may be transmitted upon a recognition that the second plurality of devices is situated in a similar manner as compared to the first plurality of devices, or at a scheduled time or upon the occurrence of a specific event in the future. The second plurality of computer devices need not be similar to any of the first plurality of computer devices, and need only share similar operational data in common that may be recognized by the rendering engine and associated with a preferred layout or configuration.

Accordingly, the systems and methods of the present disclosure may implement configuration changes to one or more computer devices based on any user attributes, operational characteristics or environmental conditions that may be gathered from such computer devices, along with information regarding layouts or configurations of one or more software applications operating on such computer devices, or the computer devices themselves. Upon correlating the user attributes, operational characteristics or environmental conditions with the information regarding the layouts or configurations of the applications or the devices, the layouts or configurations of user interfaces associated with other software applications or other computer devices may be modified accordingly, where such other applications or such other devices share one or more user attributes, operational characteristics or environmental conditions in common with the original users, software applications or computer devices. The systems and methods of the present disclosure may be utilized even where the users, the software applications or the computer devices are utilized in a completely different manner, or where the functions of the software applications or the computer devices are entirely distinct from one another.

Figure 8A:
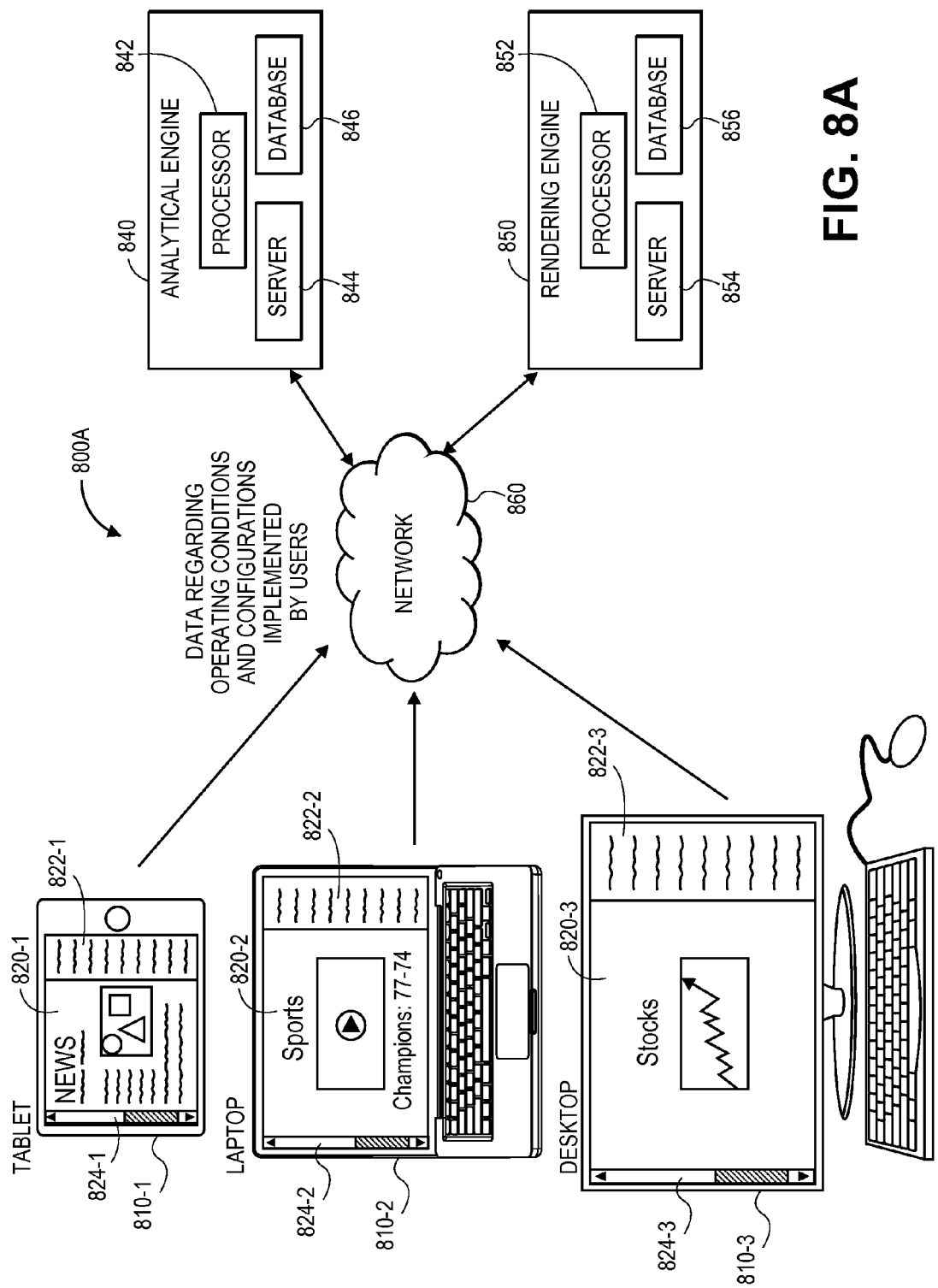
FIGS. 8A and 8B are block diagrams of illustrative systems for providing adaptive user interfaces in accordance with embodiments of the present disclosure.
Figure 8B:
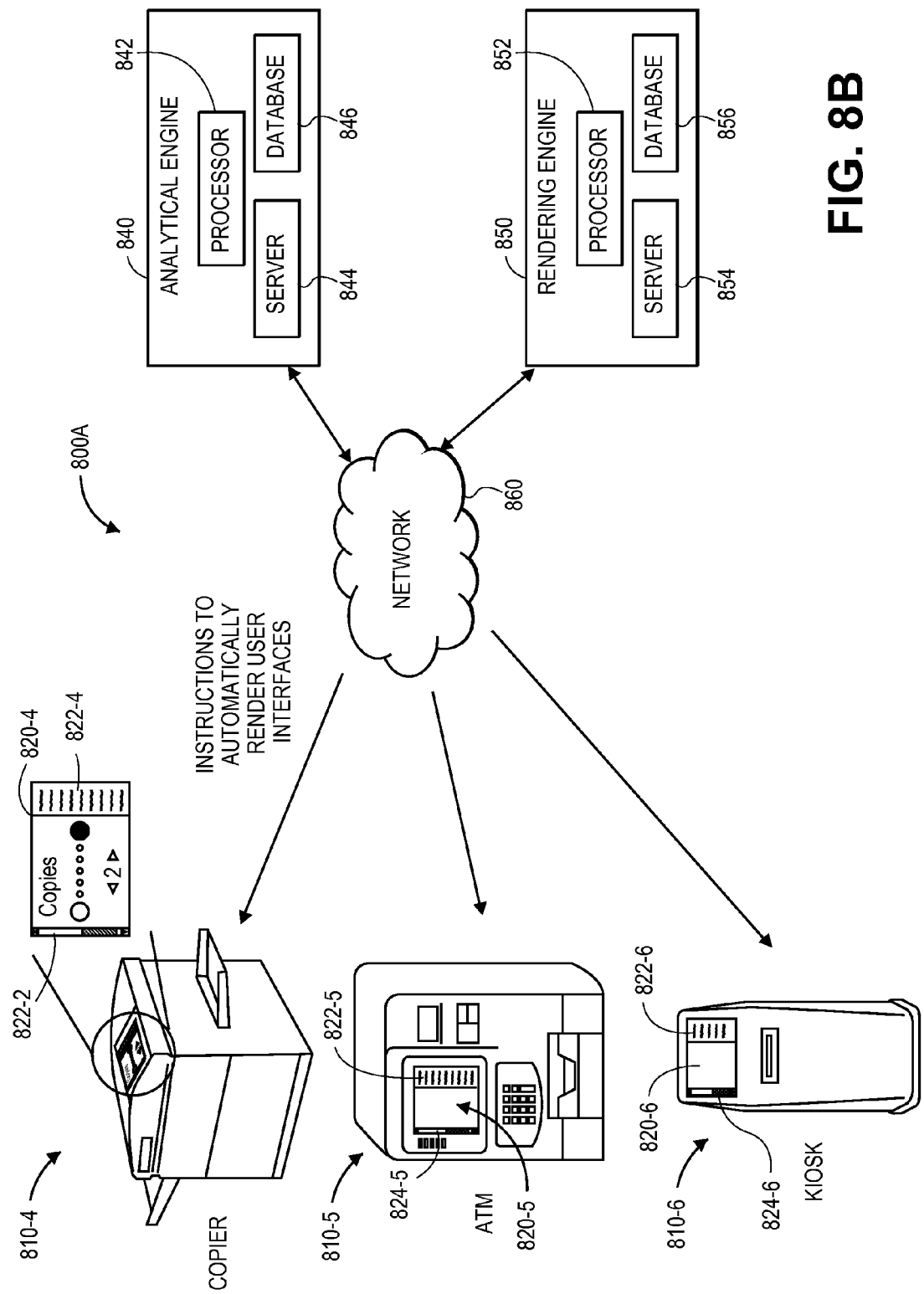
Figure 9A:
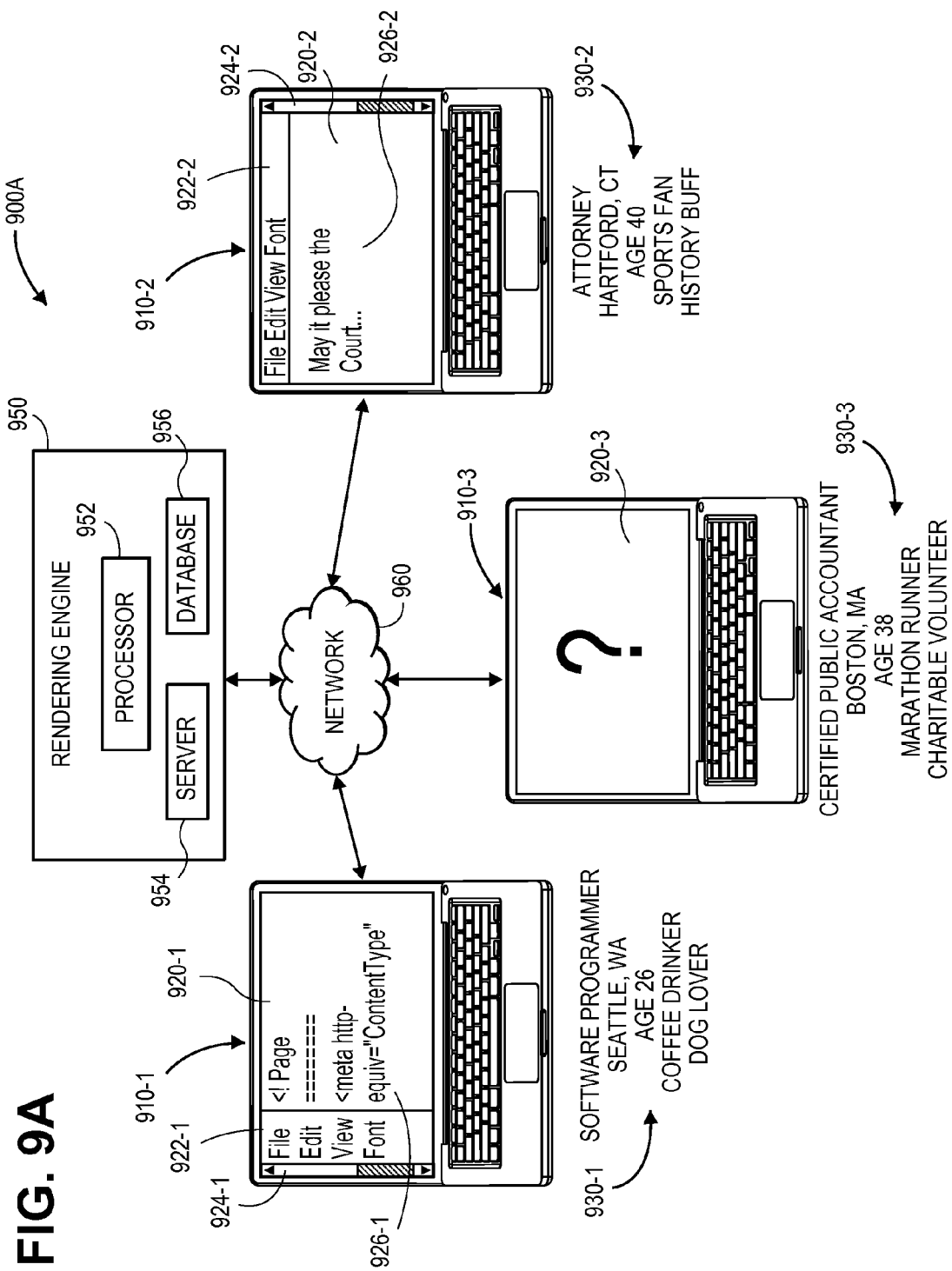
FIGS. 9A and 9B are block diagrams of an illustrative system for providing adaptive user interfaces in accordance with embodiments of the present disclosure.
Figure 9B:
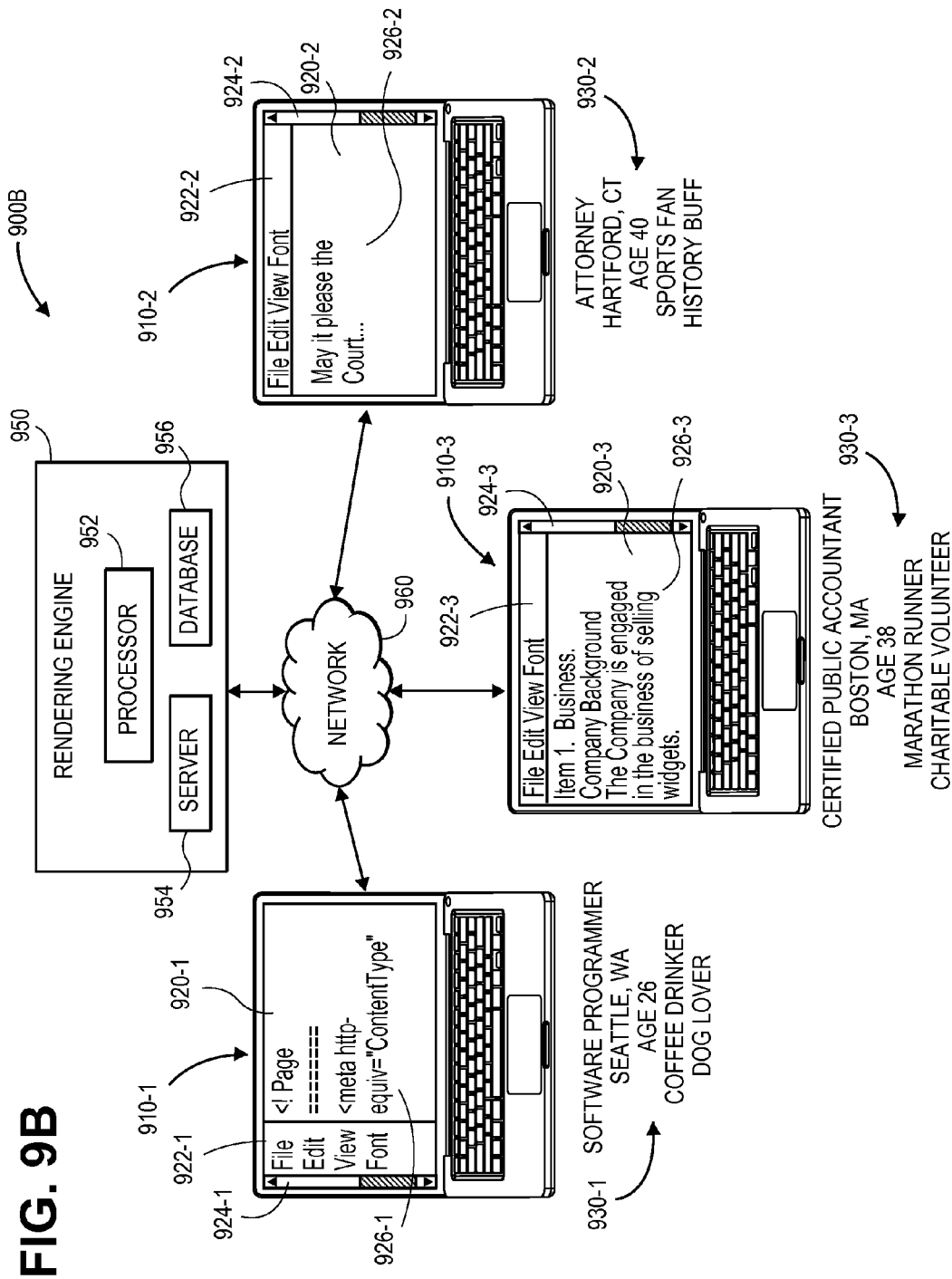

The automatic configuration of user interfaces associated with software applications or computer devices based on information or data that may be obtained from other users of different software applications or different computer devices in accordance with the present disclosure is shown with regard to FIGS. 8A and 8B, and also with regard to FIGS. 9A and 9B. Referring to FIG. 8A, a block diagram of one system 800A for providing adaptive user interfaces in accordance with embodiments of the present disclosure is shown. Except where otherwise noted, reference numerals preceded by the number "8" shown in FIG. 8A or 8B indicate components or features that are similar to components or features having reference numerals preceded by the number "6" shown in FIG. 6A or 6B, or by the number "2" shown in FIG. 2.

As is shown in FIG. 8A, the system 800A includes a tablet computer 810-1, a laptop computer 810-2 and a desktop computer 810-3, an analytical engine 840 and a rendering engine 850 that are connected to one another across a network 860, such as the Internet. The tablet computer 810-1, the laptop computer 810-2 and the desktop computer 810-3 are shown as featuring user interfaces 820-1, 820-2, 820-3 in the form of browsers displaying different web pages at a given time. Each of the user interfaces 820-1, 820-2, 820-3 of the computers 810-1, 810-2, 810-3 is shown as having a menu bar 822-4, 822-5, 822-6 along a right side and a scroll bar 824-4, 824-5, 824-6 along a left side, respectively, of the user interfaces 820-1, 820-2, 820-3.

In accordance with the present disclosure, data regarding the operating conditions and the configurations implemented by users of such computers 810-1, 810-2, 810-3 may be provided to an analytical engine 840 and a rendering engine 850. One or more covariances between the operating conditions and the configurations of the user interfaces 820-1, 820-2, 820-3 may then be determined, and rules set for configuring software applications or computer devices in accordance may be defined thereby.

Subsequently, when the same operating conditions, or similar operating conditions, are observed in connection with other users, other software applications or other computer devices, such other applications or devices may be automatically configured in a manner consistent with the rules set maintained at the rendering engine 850 that were identified based on the covariances. Referring to FIG. 8B, a system 800B including a copier machine 810-4, an automated teller machine (or "ATM") 810-5 and a kiosk 810-6, along with the analytical engine 840 and the rendering engine 850 of FIG. 8A are shown. The copier machine 810-4, the ATM 810-5 and the kiosk 810-6 each include a user interface 820-4, 820-5, 820-6.

In accordance with the present disclosure, and a rules set defined based on the correlation between the data regarding the operating conditions and the configurations implemented by users of the computers 810-1, 810-2, 810-3 of FIG. 8A, one or more instructions may be provided from the rendering engine 850 to the copier machine 810-4, the ATM 810-5 and the kiosk 810-6 of FIG. 8B. The instructions may cause the copier machine 810-4, the ATM 810-5 and the kiosk 810-6 to render the user interfaces 820-4, 820-5, 820-6 in a preferred layout or configuration. Specifically, the user interface 820-4 on the copier machine 810-4, the user interface 820-5 on the ATM 810-5 and the user interface 820-6 on the kiosk 810-6 each include a menu bar 822-4, 822-5, 822-6 along a right side and a scroll bar 824-4, 824-5, 824-6 along a left side, respectively, of the user interfaces 820-4, 820-5, 820-6.

Accordingly, the present disclosure may customize the layout or configuration of a software application operated by a user of a computer device under certain operating characteristics or environmental conditions, based on a rules set defined by correlations between operating characteristics or environmental conditions of other software applications or computer devices and the layouts or configurations of such other applications or devices. The customized layout or configuration may be identified based on the rules set, even if the software applications or computer devices that were used to derive the rules set are not related in any way to the software application or the computer device for which a customized layout or configuration is desired.

The systems and methods of the present disclosure may further customize the layout or configuration of a software application operated by a user of a computer device under certain operating conditions based on any correlations between the user of the computer device or the software application and other users of the same computer device or the same software application. Referring to FIG. 9A, a block diagram of one system 900A for providing adaptive user interfaces in accordance with embodiments of the present disclosure is shown. Except where otherwise noted, reference numerals preceded by the number "9" shown in FIG. 9A or 9B indicate components or features that are similar to components or features having reference numerals preceded by the number "8" shown in FIG. 8A or 8B, by the number "6" shown in FIG. 6A or 6B, or by the number "2" shown in FIG. 2.

As is shown in FIG. 9A, the system 900A includes a plurality of laptop computers 910-1, 910-2, 910-3 being operated by users 930-1, 930-2, 930-3 and a rendering engine 950 that are connected to one another across a network 960, such as the Internet. The laptop computer 910-1 and the laptop computer 910-2 are shown as featuring user interfaces 920-1, 920-2 that are associated with a word processing application being used by the users 930-1, 930-2. As is shown in FIG. 9A, the user 930-1 is a software programmer in his mid-twenties who is based on the West Coast, enjoys coffee and loves dogs. As is also shown in FIG. 9A, the user 930-2 is a forty-year-old attorney who lives on the East Coast and likes sports and history. While the user interface 920-1 on the laptop computer 910-1 operated by the user 930-1 includes a slider bar 924-1 along a left side of the user interface 920-1 and a vertically oriented menu bar 922-1 disposed immediately adjacent to the slider bar 924-1, the user interface 920-2 on the laptop computer 910-2 operated by the user 930-2 includes a slider bar 924-2 along a right side of the user interface 920-2, and a horizontally oriented menu bar 922-2 disposed along an upper border of the user interface 920-2. The user interfaces 920-1, 920-2 also include sets of text 926-1, 926-2 that are associated with the various uses of the word processing application by the respective users 930-1, 930-2 of the laptop computers 910-1, 910-2.

As is discussed above, the systems and methods of the present disclosure may identify a preferred layout or configuration of a user interface of a software application or a computer device based on any attributes, characteristics or conditions that may be identified regarding a user of the software application or the computer device. According to one embodiment, where a user initiates a software application or accesses a computer device, one or more of the systems or methods disclosed herein may identify information or data including attributes, characteristics or conditions regarding the user, the software application or the computer device, and compare such information or data to any relevant information or data regarding other users, software applications or computer devices in order to identify any number of form of covariances between such users, such software applications or such computer devices. For example, as is shown in FIG. 9A, where the user 930-3, viz., a late-thirties certified public accountant from the East Coast who enjoys marathons and volunteering for charity, initiates a software application on the laptop computer 910-3, the systems and methods disclosed herein may identify a preferred layout or configuration for the software application based on any similarities between the user 930-3 and either of the users 930-1, 930-2. Once a preferred layout or configuration for the software application has been identified, a user interface 920-3 associated with the software application may be rendered on the laptop computer 910-3 in accordance with the preferred layout or configuration.

Referring to FIG. 9B, a system 900B including the laptop computers 910-1, 910-2, 910-3, the users 930-1, 930-2, 930-3 and the rendering engine 950 of FIG. 9A is shown. Upon a comparison of information and data regarding the users 930-1, 930-2 to information and data regarding the user 930-3, the user 930-3 is deemed more closely similar to the user 930-2, and the user interface 920-3 is rendered on the laptop computer 910-3 in a configuration that is similar to that of the user interface 920-2 on the laptop computer 910-2. Because the age, occupation, location and personal interests of the user 930-3 are more closely related to the age, the occupation, the location or the personal interests of the user 930-2, rather than the age, the occupation, the location or the personal interests of the user 930-1, the systems and methods of the present disclosure may predict that the user 930-3 may prefer a configuration of the user interface 920-3 that is related to the configuration of the user interface 920-2, and cause the user interface 920-3 to be rendered in accordance with the preferred configuration.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, those of ordinary skill in the art would recognize that the systems and methods of the present disclosure are not limited for use on any one particular software application or computer device, and may be used to identify a preferred or appropriate layout or configuration of a user interface or other element of any number of software applications (e.g., word processors, web browsers, spreadsheets, presentation applications, E-mail clients) or computer devices (e.g., desktop computers, laptop computers, tablet computers or any kind of mobile device, such as a smartphone, or any other type of computer component) that may presently exist, or that may exist in the future, and are not limited to any of the software applications or computer devices referenced with one or more of the embodiments disclosed herein. Moreover, those of ordinary skill in the art would also recognize that the systems and methods disclosed herein may be used to identify a preferred layout or configuration of any type, kind or form of user interface rendered by any such software application or computer device.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIGS. 3, 5 and 7, the order in which the blocks of the methods or processes are listed is not intended to be construed as a limitation on the claimed inventions, and any number of the method or process blocks can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to present that an item, term, etc. may be either X, Y, or Z, or a combination thereof. Thus, such conjunctive language is not generally intended to imply that certain embodiments require at least one of X, at least one of Y and at least one of Z to each is present.

Although the invention has been described and illustrated with respect to exemplary embodiments thereof, the foregoing and various other additions and omissions may be made therein and thereto without departing from the spirit and scope of the present disclosure.

What is claimed is:

1. A computer device having at least one computer display, wherein the computer device is configured to at least:
   determine an attribute of a first user of the computer device;
   determine information regarding the computer device using at least one sensor;
   transmit information regarding the attribute of the first user and the information regarding the computer device to a rendering engine over a network;
   receive information regarding a preferred position of an interactive feature of a software application available on the computer device from the rendering engine over the network, wherein the rendering engine determines the preferred position of the interactive feature of the software application on the computer device based at least in part on the information regarding the attribute of the first user and the information regarding the computer device determined using the at least one sensor; and
   cause a display of a user interface on the at least one computer display, wherein the user interface comprises the interactive feature in the preferred position on the at least one computer display,
   wherein the user interface is associated with the software application available on the computer device.

2. The computer system of claim 1, wherein the preferred position of the interactive feature is determined by the rendering engine based at least in part on at least one action by at least a second user of the software application or the computer device.

3. The computer system of claim 1, wherein the software application is one of a word processing application, a spreadsheet application, a browser, a media playing application, an E-mail client or a special purpose application.

4. The computer system of claim 1, wherein the at least one sensor is one of:
   an optical sensor;
   a wireless transceiver;
   an accelerometer;
   a gyroscope;
   a microphone;
   a thermometer;
   a heat sensor;
   a location sensor;
   a cellular transceiver;
   a bar code reader; or
   a radiation sensor.

5. The computer system of claim 1, wherein the interactive feature is at least one of:
   a menu bar on the user interface;
   a slider bar on the user interface;
   an action button on the user interface; or
   an address bar on the user interface.

6. A computer-implemented method comprising:
   determining a first attribute of at least one of:
      a user of a computer device;
      a software application available on the computer device; or
      the computer device;
   determining a second attribute of at least one of:
      the user of a computer device;
      the software application available on the computer device; or
      the computer device;
   determining a covariance of at least the first attribute and the second attribute;
   selecting a configuration for one of the software application or the computer device based at least in part on the covariance; and
   rendering a user interface associated with the one of the software application or the computer device in accordance with the selected configuration on a computer display.

7. The computer-implemented method of claim 6, wherein selecting the configuration for the one of the software application or the computer device based at least in part on the covariance comprises:
   transmitting at least the first attribute and the second attribute to a rendering engine over a network; and
   receiving information regarding the selected configuration from the rendering engine over the network.

8. The computer-implemented method of claim 7, wherein the information regarding the selected configuration identifies at least one of:
   an orientation of content on the user interface;
   a position or an orientation of a menu bar on the user interface;
   a position or an orientation of a slider bar on the user interface;
   a lighting condition of the computer display; or
   a volume setting of the computer device.

9. The computer-implemented method of claim 6, wherein determining the covariance of at least the first attribute and the second attribute comprises:
   identifying information regarding a plurality of configurations of software applications or computer devices established by users; and
   identifying attributes of the users, the software applications or the computer devices; and
   wherein selecting the configuration for the one of the software application or the computer device based at least in part on the covariance comprises:
   selecting one of the plurality of configurations corresponding to the first attribute and the second attribute.

10. The computer-implemented method of claim 9, wherein the information regarding the plurality of configurations of the software applications or the computer devices established by the users comprises at least one action taken by one of the plurality of users to establish one of the plurality of configurations.

11. The computer-implemented method of claim 6, wherein determining the covariance of at least the first attribute and the second attribute comprises:

defining a covariance matrix comprising information regarding at least the first attribute and the second attribute; and programming a rendering engine based at least in part on the covariance matrix, wherein the configuration for the one of the software application or the computer device is selected by the rendering engine.

12. The computer-implemented method of claim 6, wherein the computer device is one of a desktop computer, a laptop computer, a tablet computer, a personal digital assistant, a digital media player or a smartphone.

13. The computer-implemented method of claim 6, wherein the software application is one of a word processing application, a spreadsheet application, a browser, a media playing application, an E-mail client or a special purpose application.

14. The computer-implemented method of claim 6, wherein one of the first attribute or the second attribute comprises at least one of a location of the user; a preference of the user; an age of the user; or an occupation of the user.

15. The computer-implemented method of claim 6, wherein the computer device comprises at least one sensor, and
wherein determining the first attribute comprises:
capturing information regarding the at least one of the user, the software application or the computer device using the at least one sensor; and
determining the first attribute based at least in part on the captured information.

16. The computer-implemented method of claim 15, wherein the at least one sensor comprises at least one of an optical sensor, a wireless transceiver, an accelerometer, a gyroscope, a microphone, a thermometer, a heat sensor, a location sensor, a cellular transceiver, a bar code reader or a radiation sensor.

17. A method comprising:
receiving information regarding a first attribute of a first user of a first computer device;
receiving information regarding a first operational characteristic of the first computer device or a first software application operating on the first computer device;
receiving information regarding a first environmental condition of the first computer device;
determining at least one covariance of at least two of the first attribute, the first operational characteristic, or the first environmental condition;
identifying at least one configuration of a first user interface associated with one of the first software application or the first computer device based at least in part on the at least one covariance;
storing an association of the at least one configuration with the at least one covariance in at least one data store; and
programming a rendering engine based at least in part on the association.

18. The method of claim 17, further comprising:
identifying information regarding at least one of:
a second attribute of a second user of a second computer device;
a second operational characteristic of the second computer device or a second software application operating on the second computer device, or
a second environmental condition of the second computer device;
providing the information regarding the at least one of the second attribute, the second operational characteristic or the second environmental condition to the rendering engine;
receiving information regarding the at least one configuration from the rendering engine; and
causing a display of a second user interface associated with one of the second software application or the second computer device in accordance with the at least one configuration on a computer display.

19. The method of claim 18,
wherein the first attribute is associated with the second attribute,
wherein the first operational characteristic is associated with the second operational characteristic, or
wherein the first environmental condition is associated with the second environmental condition.

20. The method of claim 18, wherein identifying the at least one configuration of one of the first software application or the first computer device comprises:
identifying at least one action taken by a user of one of the first computer device or the first software application to establish the at least one configuration.

21. The method of claim 18, wherein the information regarding the at least one configuration comprises:
at least one instruction for automatically displaying the second user interface associated with one of the second software application or the second computer device in accordance with the at least one configuration on the computer display.

* * * * *